United States Patent [19]
Ferguson et al.

[11] Patent Number: 5,894,093
[45] Date of Patent: Apr. 13, 1999

[54] DUAL MODE VENT PLUG FOR A PRESSURE GAUGE

[75] Inventors: Walter J. Ferguson, Waterbury; Albert V. Yannella, Milford, both of Conn.

[73] Assignee: Dresser Industries, Inc., Dallas, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/439,727

[22] Filed: May 12, 1995

[51] Int. Cl.⁶ .......................................... G01L 7/00
[52] U.S. Cl. .......................................... 73/756; 73/706
[58] Field of Search .......................... 73/706, 708, 738, 73/756

[56] References Cited

U.S. PATENT DOCUMENTS 4,449,412  5/1984  Fallon et al. .................. 73/756
5,012,678  5/1991  Buchanan ...................... 73/756

FOREIGN PATENT DOCUMENTS 2036498  12/1970  France .
69003096  9/1990  Germany .
8902462  5/1991  Netherlands .

Primary Examiner—Richard Chilcot
Assistant Examiner—William L. Oen
Attorney, Agent, or Firm—Michael J. DeSha

[57] ABSTRACT

An improved closure for a pressure gauge includes a stem or a sleeve which selectively provides a vent path when set by the end user. The closure device provides an automatic venting if in the normally closed condition by means of an overpressure valve arrangement in the sleeve. Therefore the two functions are incorporated in the single closure device.

20 Claims, 5 Drawing Sheets

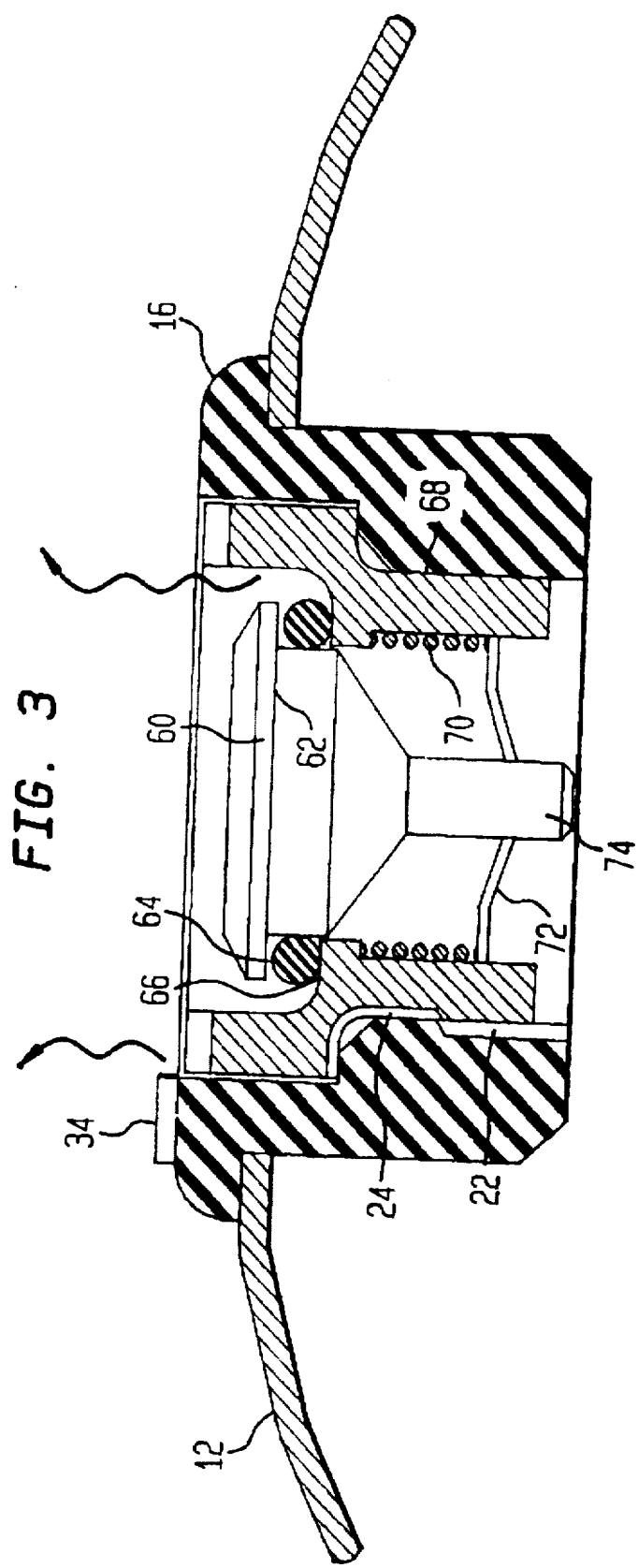

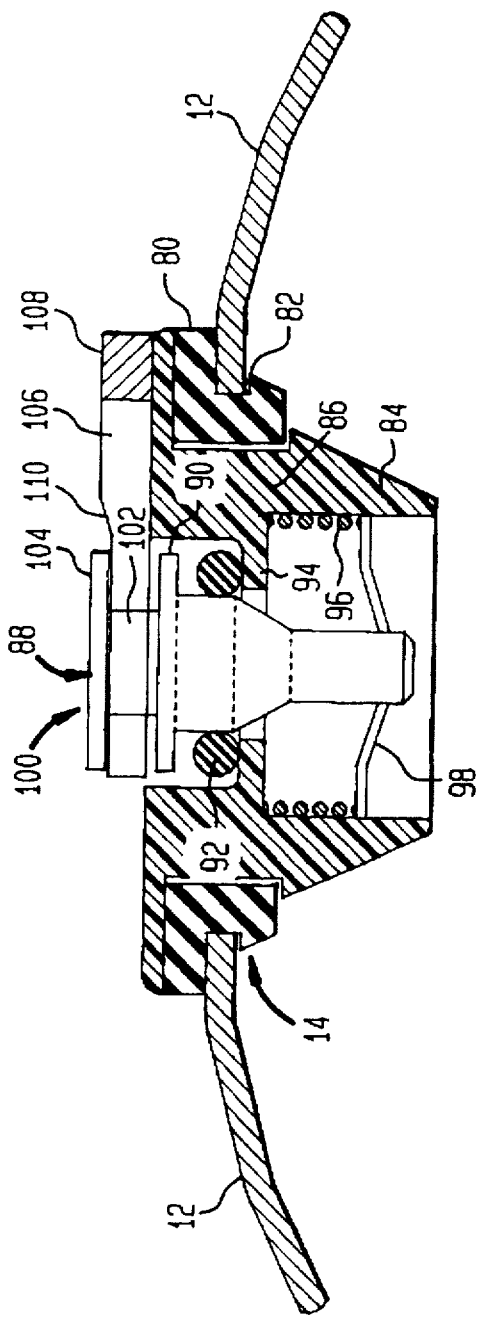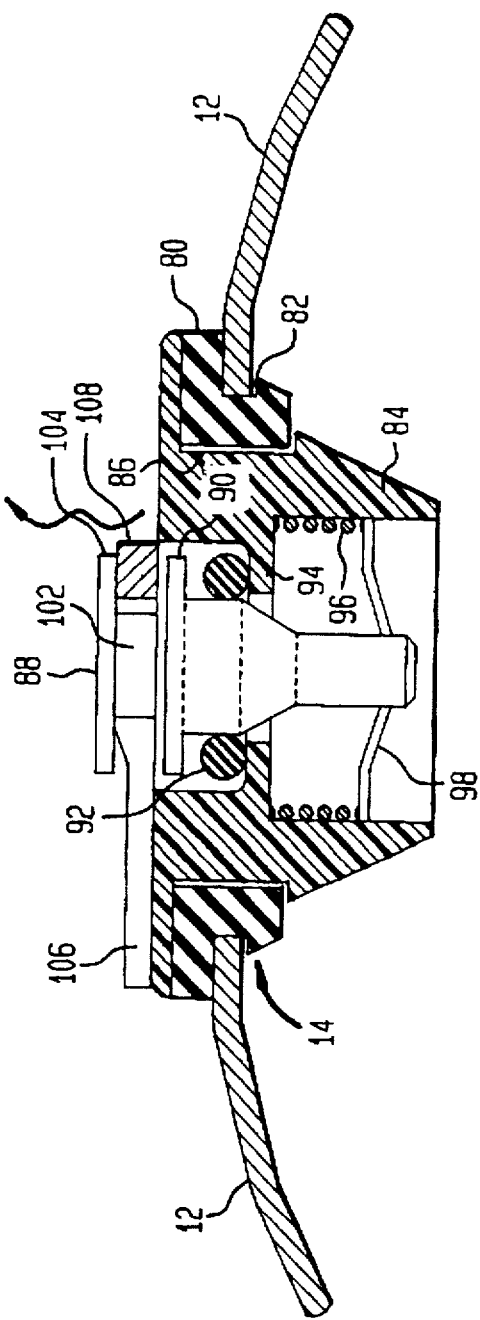

DUAL MODE VENT PLUG FOR A PRESSURE GAUGE

FIELD OF THE INVENTION

The invention relates to pressure gauges and more particularly to an improvement in vent plugs for a pressure gauge.

BACKGROUND OF THE INVENTION

U.S. Pat. No. 3,874,241 issued to Harland shows a pressure gauge in which the vent plug in accordance with the invention may be utilized. In the Harland gauge there is provided a pressure relief valve and a filling plug which is capable of being sealed and resealed by pushing in the plug to seal the gauge and pulling it out in order to vent the gauge. One of the problems found to be associated with the Harland type closures is that the separate venting and relieving assemblies may create problems for maintaining integrity against leaks in the gauge. Additionally, in many cases these assemblies may interfere with panel mounting applications due to the close fit required for the outer diameter of the gauge case.

U.S. Pat. No. 4,051,730 to Andrew et al discloses a pressure gauge having a blow out back assembly which includes a diaphragm and a resiliently firm back cover plate. The cover plate is bolted to the back side of the pressure gauge and apparently serves to hold the diaphragm in sealed contact with the inside of the pressure gauge.

U.S. Pat. No. 4,449,412 to Fallon et al. discloses a pressure relief valve means which includes a diaphragm biased by a coil spring. When the pressure exceeds the force exerted by the spring, the inlet is exposed to first and second relief passageways.

U.S. Pat. No. 5,012,678 to Buchanan discloses an overpressure relief safety plug for use with pressure gauges that includes a plug held in place by a strap and anchoring means fixing the plug to the exterior of the housing.

U.S. Pat. No. 4,064,890 to Collins et al. discloses a pressure regulator and safety relief valve where an elastomeric element is biased by a spring against an inlet port.

U.S. Pat. No. 2,522,007 to Willach discloses a pressure indicating and relieving device having an adjustable pressure relief means comprising a valve and longitudinal slot provided in the inner surface of a plug. Rotation of the valve adjusts fluid communication between a passageway and the longitudinal slot.

U.S. Pat. No. 3,701,284 to DeMeyer discloses a pressure gauge having a vented filler element provided in the upper portion of the gauge case. A rear closure plate is biased in place by a resilient element and provides a means for pressure relief when undue pressure builds up in the gauge housing.

SUMMARY OF THE INVENTION

It is therefore an object of the invention to provide a novel multi-function instrument closure assembly for all types of instruments and gauges types, both dry and liquid-filled.

It is another object of the invention to provide a gauge or instrument which may be set by the end-user into a hermetically sealed or to a vented condition.

It is yet another object of the invention to provide a multi-function closure in which pressure build-up due to pressure system leakage is automatically relieved in a safe manner.

These and other objects are met in accordance with the invention in an instrument including a housing having a peripheral wall defining an interior and exterior of the gauge, the peripheral wall having an opening therein and a closure assembly for sealing the opening, the improvement comprising the closure assembly including a closure element for sealingly engaging the opening, the closure element having a bore therein and providing a first portion of a vent path between the interior and exterior of the gauge, a stem rotatably received in the bore of the closure element for sealingly engaging the closure element, said stem having a second portion of a vent path operative for alignment with the vent path of the closure element and said stem being rotatable in said bore to a position where the first and second portions of the vent path are aligned to allow fluid communication between the exterior and interior of the instrument.

Preferably, the closure assembly also includes a pressure relief valve which may be a stem arranged in the bore of a sleeve. The stem holds a gasket which normally seals the bore until the internal pressure overcomes a spring force provided by a flat or helical spring.

The stem may also be a poppet which the user may open manually for venting if desired using a lifting key captured on an extension of the poppet.

BRIEF DESCRIPTION OF THE DRAWING

FIG. 3 is still another embodiment of a device in accordance with the invention.

FIG. 4a and 4b show yet another embodiment of the device in accordance with the invention.

DESCRIPTION OF THE PREFERRED EMBODIMENT

Figure 1:
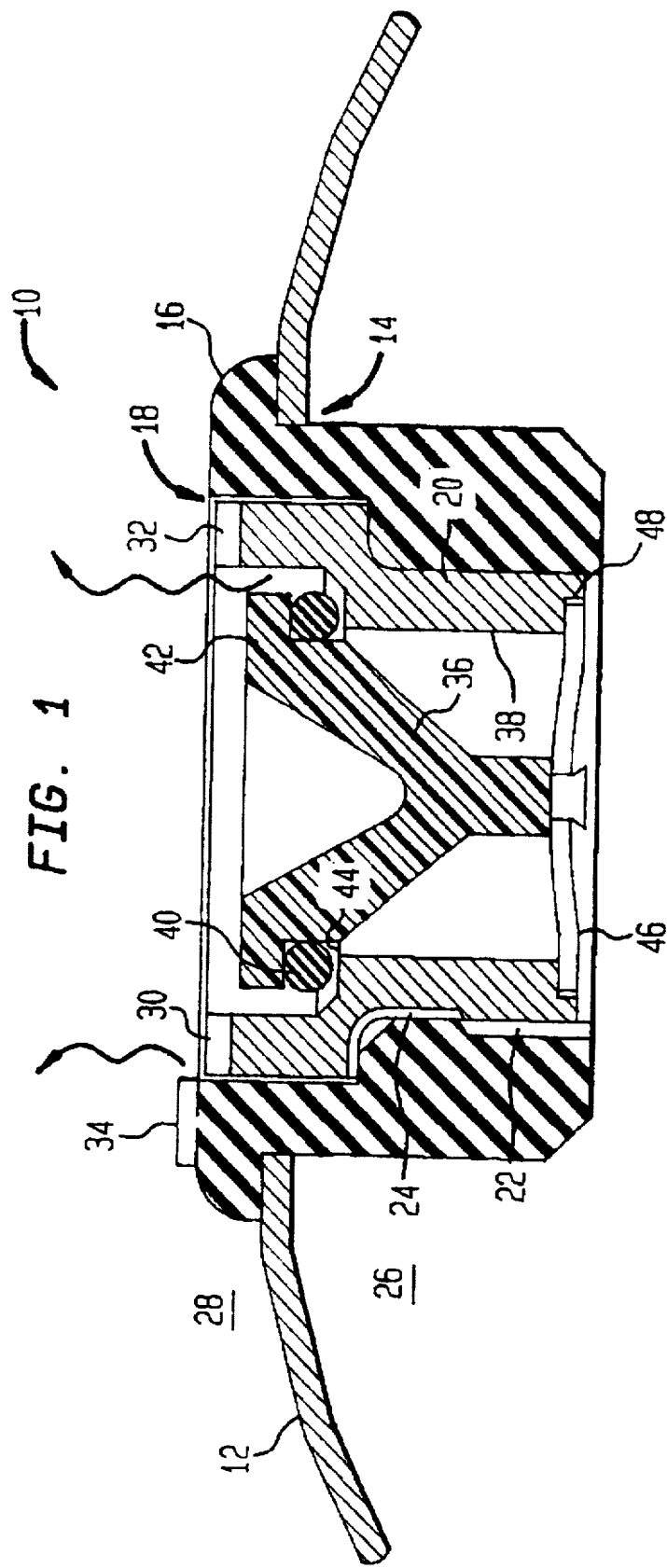
FIG. 1 is a cross section of a vent plug in accordance with the invention.

In FIG. 1, there is shown generally at 10 a closure assembly in accordance with the invention located in the wall 12 of a pressure measuring device. The pressure device may be of the type illustrated in U.S. Pat. No. 3,874,241 issued to Harland, the specification of which is specifically incorporated by reference herein. Opening 14 in the gauge wall is preferably at or near the 12 o'clock position when the gauge is installed sealingly receives closure element or grommet 16, preferably manufactured of molded rubber, having a stepped bore 18 in which is rotatably received sleeve 20, suitably of molded plastic.

At at least one point on the periphery of the bore 18 there is provided a molded blind slot 22 opening to the interior of the gauge and extending from the interior end of the grommet to a point where it can overlap a portion of a corresponding blind slot 24 of the sleeve 20 opening to the exterior of the gauge. The sleeve 20 is rotatable in the bore 18 so that in at least one position the ends of slots 22 and 24 overlap so as to allow fluid communication between the interior of the gauge indicated at 26 and the external environment indicated at 28. It will be appreciated that when the sleeve is rotated into another position, the slots 22 and 24 are not aligned, the ends of the slots are sealed off, and there is therefore no fluid communication between the interior and exterior of the gauge. It also will be understood that, if desired, the corresponding blind slots may be arranged to open in the opposite directions to those illustrated and that other types of apertures rather than slots may also be used to provide the fluid communication at the proper alignment. It will also be appreciated that additional slots may be used if desired.

Preferably, the rotational alignment may be carried out by means of suitable screwdriver slots 30 and 32 at the outer end of the plastic sleeve 20. Suitably an alignment mark 34 may be molded into the top edge of the rubber grommet 16 to indicate the aligned position of the slots.

The closure device in accordance with the invention also includes a pressure relief valve assembly. Stem 36 is arranged in bore 38 of the sleeve 20 such that a gasket, such for example O-ring 40, which is suitably held by means such as lip 42 of the stem, sealingly engages shoulder 44 of the stepped bore 38. At the base of stem 36 is attached, suitably by means of an ultrasonic stake, heat weld or the like, a flat spring member 46 the circumference of which is held in a peripheral groove 48 of the sleeve 20. It will be understood from viewing the figure that any excessive pressure in the interior of the gauge will cause the O-ring 40 to unseal as spring member 46 deforms upwardly to vent any overpressure safely to the exterior as the O-ring is unseated from the shoulder 44.

Figure 2:
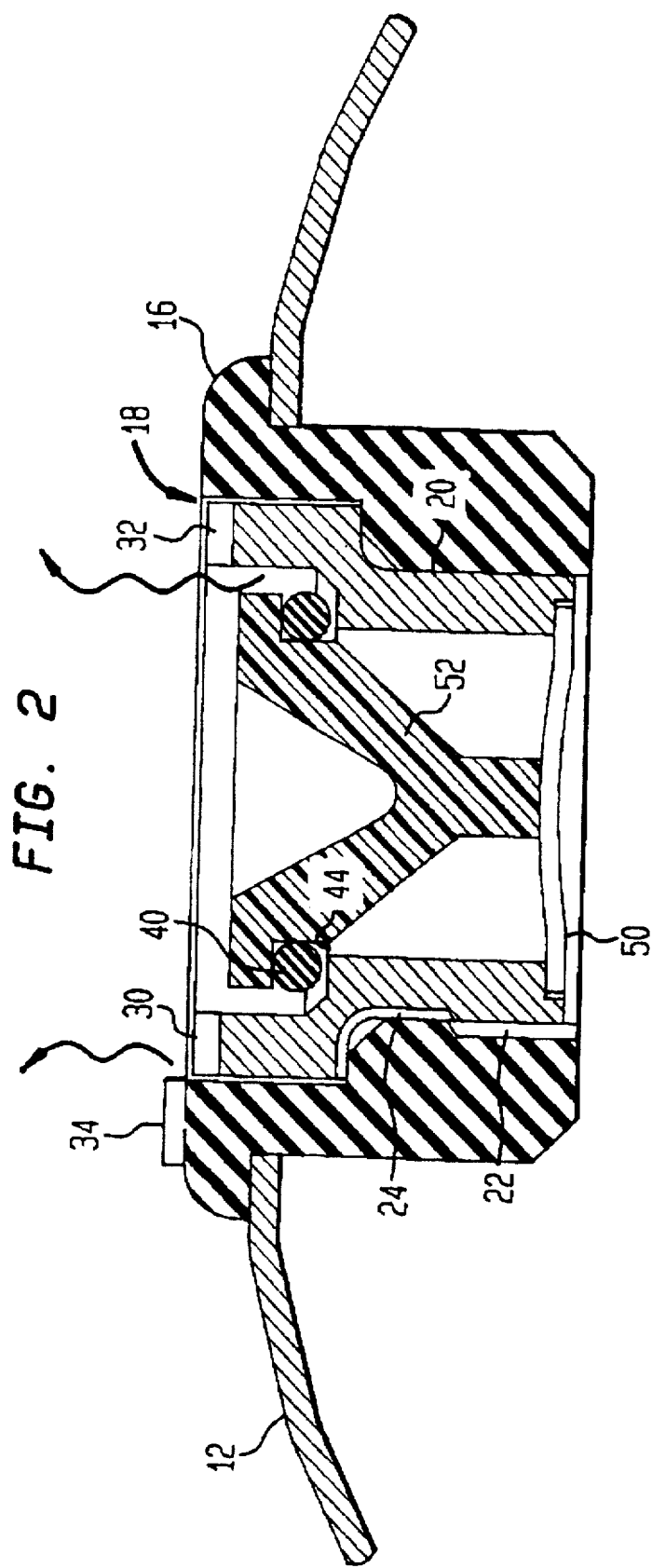
FIG. 2 is a schematic of another embodiment of a plug in accordance with the invention.

FIG. 2 shows an embodiment of the invention in which the spring member shown at 50 is integrally molded to the stem 52. The remainder of the device is as shown in FIG. 1 and therefore the numbers of like parts are retained and for the description the reader is referred to FIG. 1.

If the end-user application can tolerate a low flow rate the flat springs illustrated in FIGS. 1 and 2 will normally suffice. However, if a so-called "popping action" is required, then the helical compression spring shown in the embodiment of FIG. 3 provides a much higher lift when the valve suddenly moves from its normally closed position to the full open position. Such a helical spring also affords greater ease of setability.

In the embodiment illustrated in FIG. 3, the stem is replaced by poppet 60 having lip 62 for retaining a gasket, suitably O-ring 64, sealingly engaging lip 66 of the plastic sleeve 68. Helical spring 70 is held in compression against the underside of lip 66 suitably by use of Tinnerman nut 72 threaded onto the stem 74 of poppet 60. It will again be understood that any overpressure in the interior of the gauge will cause the poppet to move upwardly to in turn cause O-ring 64 to disengage from the lip 66 to vent the overpressure. It will be understood that the remainder of the device is as illustrated in the previous FIGS. and therefore the same numbers are retained for the common features.

FIGS. 4a and 4b illustrate yet another embodiment of the invention. In this device in accordance with the invention, molded rubber grommet 80 is received in opening 14 of the gauge wall 12 and held in position by means of groove 82 engaging the edge of the opening. The grommet 80 receives sleeve 84 in its bore, the sleeve in turn having a groove 86 in which the grommet 80 is captured. The sleeve maintains its position in the grommet and the venting is by means of a lifting key as described below.

The poppet 88 includes shoulder 90 against which O-ring 92 is seated so as to sealingly engage the lip 94 of the sleeve 84. Helical spring 96 is held in compression as described in FIG. 3, preferably by Tinnerman nut 98 for firmly holding the poppet in place until the spring force is overcome by pressure against the nut.

In this embodiment, in order to provide the required venting by an end-user, the poppet 88 is provided with an extension 100 having an undercut portion at 102 which creates an overhang 104. Lifting key 106 is snap-fitted over the undercut 102 in the poppet extension 100. In the closed position illustrated in FIG. 4a, the lifting key is simply held captive on the poppet but does not exert any force on it. When it is desired to manually vent any internal case pressure, the end 108 of the key 106 is pushed to ramp up the poppet via the ramp 110 of the key 106 to lift the poppet into its normally open position illustrated in FIG. 4b. This open position may be maintained for so long as the user desires. When the key 106 is pulled back, the poppet 88 is restored to its normally closed position, for transporting or the like.

Figure 5A:
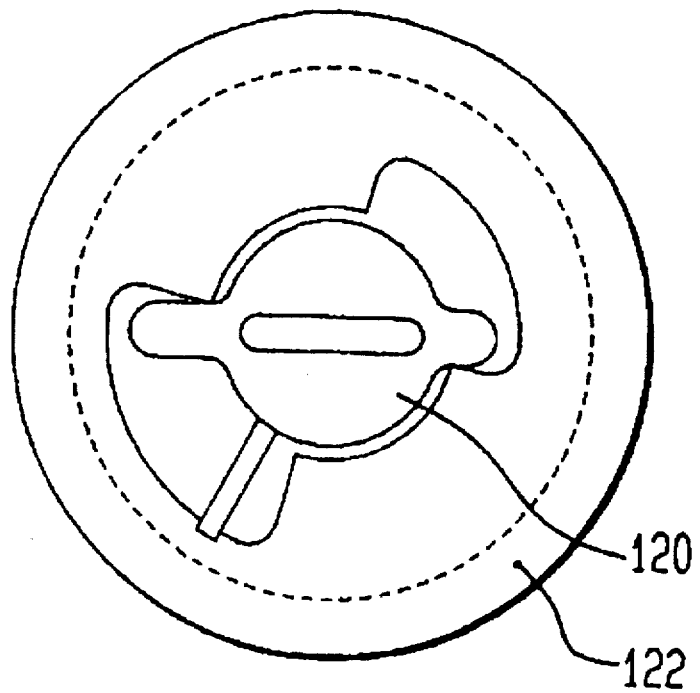
FIGS. 5a and 5b show the device of the invention having a rotatable stem.
Figure 5B:
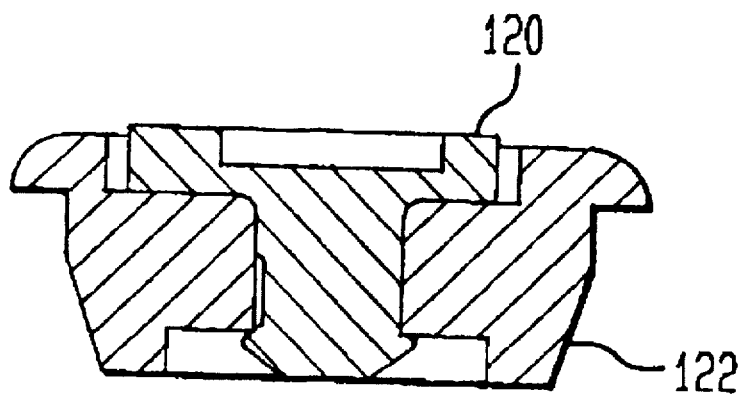

FIGS. 5a and 5b show an embodiment of the invention in which rotatable stem 120 is seated in the closure element 122. Rotation of the stem 120 aligns the passages as previously described in conjunction with the earlier figures.

What is claimed is:

1. A pressure gauge including a housing having a peripheral wall defining an interior and exterior of the gauge, the peripheral wall having an opening therein, a closure assembly including a closure element for sealingly engaging the opening for retaining the closure element, the closure element including a bore and a first portion of a vent path, a sleeve rotatably received in the bore of the closure element for sealingly engaging the closure element, said sleeve having an opening and a second portion of a vent path arranged so that in at least one position of the sleeve the first and second portions of the vent path are aligned so as to provide a complete vent path between the interior and exterior of the gauge, said assembly further comprising sealing means in the opening of the sleeve and spring means connected to the sealing means for normally forcing the sealing means into a closed position, and said sealing means being unsealable upon an overpressure condition in the interior overcoming the force of the spring means.

2. The apparatus of claim 1 further comprising means for rotating the sleeve in the bore.

3. The apparatus of claim 2 wherein the means for rotating comprises screwdriver slots on the sleeve.

4. The apparatus of claim 3 further comprising a mark on the closure element for indicating alignment with the screwdriver slots when the sleeve is set to the aligned position.

5. The apparatus of claim 1 wherein the sealing means is an O-ring and the spring means is a flat spring.

6. The apparatus of claim 1 wherein the sealing means is a poppet valve and the spring means is a helical spring.

7. In a pressure gauge including a housing having a peripheral wall defining an interior and exterior of the gauge, the peripheral wall having an opening therein and a closure assembly for sealing the opening, the improvement comprising the closure assembly including a closure element for sealingly engaging the opening, the closure element having a bore therein and providing a first portion of a vent path between the interior and exterior of the gauge defined on the interior surface of said bore, a stem rotatably received in the bore of the closure element for sealingly engaging the closure element, said stem having a second portion of a vent path defined on the exterior surface of said stem and operative for alignment with the vent path of the closure element and said stem being rotatable in said bore to a position where the first and second portions of the vent path are aligned to allow fluid communication between the exterior and interior of the pressure gauge extending intervening between the bore surface of said closure member and the exterior surface of said stem.

8. The closure apparatus of claim 7 further comprising a pressure relief assembly arranged in the opening of the stem, the pressure relief assembly including sealing means in the opening of the stem and spring means connected to the sealing means for normally forcing the sealing means into a closed position, and said sealing means being unsealable upon an overpressure condition in the interior overcoming the force of the spring means.

9. The apparatus of claim 8 wherein the sealing means is an O-ring and the spring means is a flat spring.

10. The apparatus of claim 8 wherein the sealing means is a poppet valve and the spring means is a helical spring.

11. The apparatus of claim 7 further comprising means for rotating the stem in the bore.

12. The apparatus of claim 11 wherein the means for rotating comprises screwdriver slots on the stem.

13. The apparatus of claim 12 further comprising a mark on the closure element for indicating alignment with the screwdriver slots when the stem is set to the aligned position.

14. The closure assembly of claim 7 wherein the first portion of the vent path is a first blind slot in the periphery of the bore of the closure element opening to the interior and the second portion of the path is a second blind slot in the periphery of the stem, the second blind slot opening to the exterior, the blind slots being arranged so as to overlap when the stem is in the aligned position.

15. A pressure gauge including a housing having a peripheral wall defining an interior and exterior of the qauge, the peripheral wall having an opening therein, a closure assembly including a closure element for sealingly engaging the opening for retaining the closure element, the closure element including a bore, a sleeve received in the bore of the closure element for sealingly engaging the closure element, said sleeve having an opening therein, sealing means in the opening of the sleeve and spring means connected to the sealing means for normally forcing the sealing means into a closed position, said sealing means being unsealable upon an overpressure condition in the interior overcoming the force of the spring means, and further comprising lifting means for manually unsealing said sealing means, said lifting means including a lift key.

16. An instrument including a housing having a peripheral wall defining an interior and exterior of the housing, the peripheral wall having an opening therein, a closure assembly including a closure element for sealingly engaging the opening for retaining the closure element, the closure element including a bore and a first portion of a vent path defined on the interior surface of said bore a stem rotatably received in the bore of the closure element for sealingly engaging the closure element, said stem having an opening and a second portion of a vent path defined on the exterior surface of said stem and arranged so that in at least one position of the stem the first and second portions of the vent path are aligned so as to provide a complete vent path between the interior and exterior of the housing extending intervening between the bore surface of said closure member and the exterior surface of said stem.

17. A vent assembly for placement in a peripheral wall opening of a pressure gauge communicating between the interior and exterior of the gauge and comprising:

a closure element receivable in said wall opening in a sealing and retained relation thereto, the closure element including a bore and a first portion of a vent path;

a sleeve arcuately displaceable in the bore of the closure element for sealingly engaging the closure element, said sleeve having an opening and a second portion of a vent path arranged so that in at least one position of the sleeve the first and second portions of the vent path are aligned so as to provide a complete vent path between the interior and exterior of the gauge;

sealing means in the opening of the sleeve; and spring means biasing the sealing means toward normally forcing the sealing means into a closed position, said sealing means being responsive to an overpressure condition in the interior of the gauge to overcome the force of the spring means and unseal said sealing means.

18. The apparatus of claim 17 further comprising means for arcuately displacing the sleeve in the bore between said first and second positions.

19. A vent assembly for placement in a peripheral wall opening of an instrument housing communicating between the interior and exterior of the housing and comprising:

a closure element receivable in the wall opening of the instrument in a sealing and retained relation thereto, the closure element including a bore and a first portion of a vent path defined on the interior surface of said bore; and a stem arcuately displaceable in the bore of the closure element for sealingly engaging the closure element, said stem having an opening and a second portion of a vent path defined on the exterior surface of said stem and arranged so that in at least one position of the stem the first and second portions of the vent path are aligned so as to provide a complete vent path between the interior and exterior of the housing extending intervening between the bore surface of said member and the exterior surface of said stem.

20. The vent assembly of claim 19 further comprising a pressure relief assembly arranged in the opening of the stem, the pressure relief assembly including sealing means in the opening of the stem and spring means connected to the sealing means for normally forcing the sealing means into a closed position, and said sealing means being unsealable upon an interior overpressure condition in overcoming the force of the spring means.

* * * * *